Sept. 10, 1968 P. J. BROWN ET AL 3,401,346

BINARY DATA DETECTION SYSTEM EMPLOYING PHASE MODULATION TECHNIQUES

Filed Dec. 28, 1965 2 Sheets-Sheet 1

INVENTORS
PAUL J. BROWN
EARL G. MC DONALD, JR

BY Owen Lamb

AGENT

Sept. 10, 1968 P. J. BROWN ET AL 3,401,346

BINARY DATA DETECTION SYSTEM EMPLOYING PHASE MODULATION TECHNIQUES

Filed Dec. 28, 1965 2 Sheets-Sheet 2

United States Patent Office 3,401,346
Patented Sept. 10, 1968

3,401,346

BINARY DATA DETECTION SYSTEM EMPLOYING PHASE MODULATION TECHNIQUES

Paul J. Brown, Poughkeepsie, N.Y., and Earl G. McDonald, Jr., Shelburne, Vt., assignors to International Business Machines Corporation, Armonk, N.Y., a corporation of New York Filed Dec. 28, 1965, Ser. No. 517,024
8 Claims. (Cl. 329—104)

ABSTRACT OF THE DISCLOSURE

A phase-encoded binary data detection circuit in which a frequency controlled time gate is utilized to distinguish between binary ones and binary zeros. A ramp voltage is generated every time a data transition (i.e. a one or a zero) occurs. The ramp rises until the next data transition at which time it is abruptly terminated and a new ramp started. Each time the ramp voltage reaches a firing level it fires a threshold device which controls the time gate. The firing level of the threshold device is controlled by the amplitude of the ramp voltage so that as the frequency of data increases the firing point is made earlier on the ramp. The result is that the threshold device turns on earlier for high frequencies and later for low frequencies, thus providing a time gate for data which is variable with respect to frequency.

This invention relates to binary data detection systems and more particularly to such systems in which the binary information is recorded in the form of signals which experience at least one change in polarity for each data bit.

In systems employing phase modulation techniques each binary bit cell experiences a change in polarity at the center of the bit cell. The direction of the polarity change represents the binary value of the information. For example, a binary 1 may be represented by a change from a positive level to a negative level at the center of a bit cell and a binary 0 may be represented by a change from a negative level to a positive level. If an electrical signal is produced having a direct correspondence to the recorded or received data pattern and if this electrical signal is compared with a reference signal, the electrical signal representing the binary information would be in phase or out of phase with the reference signal depending upon the binary information represented.

The attractive feature of phase modulation techniques is that self clocking of the binary information can be achieved. Since each binary bit cell has a change in state at the center of the cell, the change may be detected at the same frequency as the binary information originally recorded.

In prior systems, an electrical pulse is generated as a result of the flux change at the center of each bit cell. This pulse is utilized to produce an electrical wave whose frequency and phase is controlled by the binary data. The reference phase thus generated is subsequently utilized to determine the phase of the electrical signal derived from the received or recorded information.

In magnetic recording at high densities, mechanical tolerances are so critical that slight variations in speed of the record medium cause rapid time displacement of the reproduced electrical signals such that polarity sensing may produce an erroneous signal. Prior systems for reading data by generating a clock pulse which varies with the frequency of the data tend to be expensive if the system is to tolerate large velocity variations.

It is accordingly a paramount object of the present invention to provide an improved binary detection system which is capable of following large frequency variations.

It is also an object of this invention to provide a binary detection system which can be easily synchronized with the phase of the detected data.

The above objects are accomplished in accordance with the invention by providing a frequency controlled time gate which gates only the data transitions of the phase encoded signal. The polarity of the gated transitions indicates the information content of the binary data. The frequency of the time gate is controlled by generating a reference voltage, the level of which varies with the frequency of the recorded data. The time at which the frequency gate is turned on is determined by the magnitude of the frequency varying reference voltage. The frequency controlled time gate is always turned off with a data transition.

The foregoing and other objects, features and advantages of the invention will be apparent from the following more particular description of a preferred embodiment of the invention, as illustrated in the accompanying drawings in which.

Figures 1, 2:
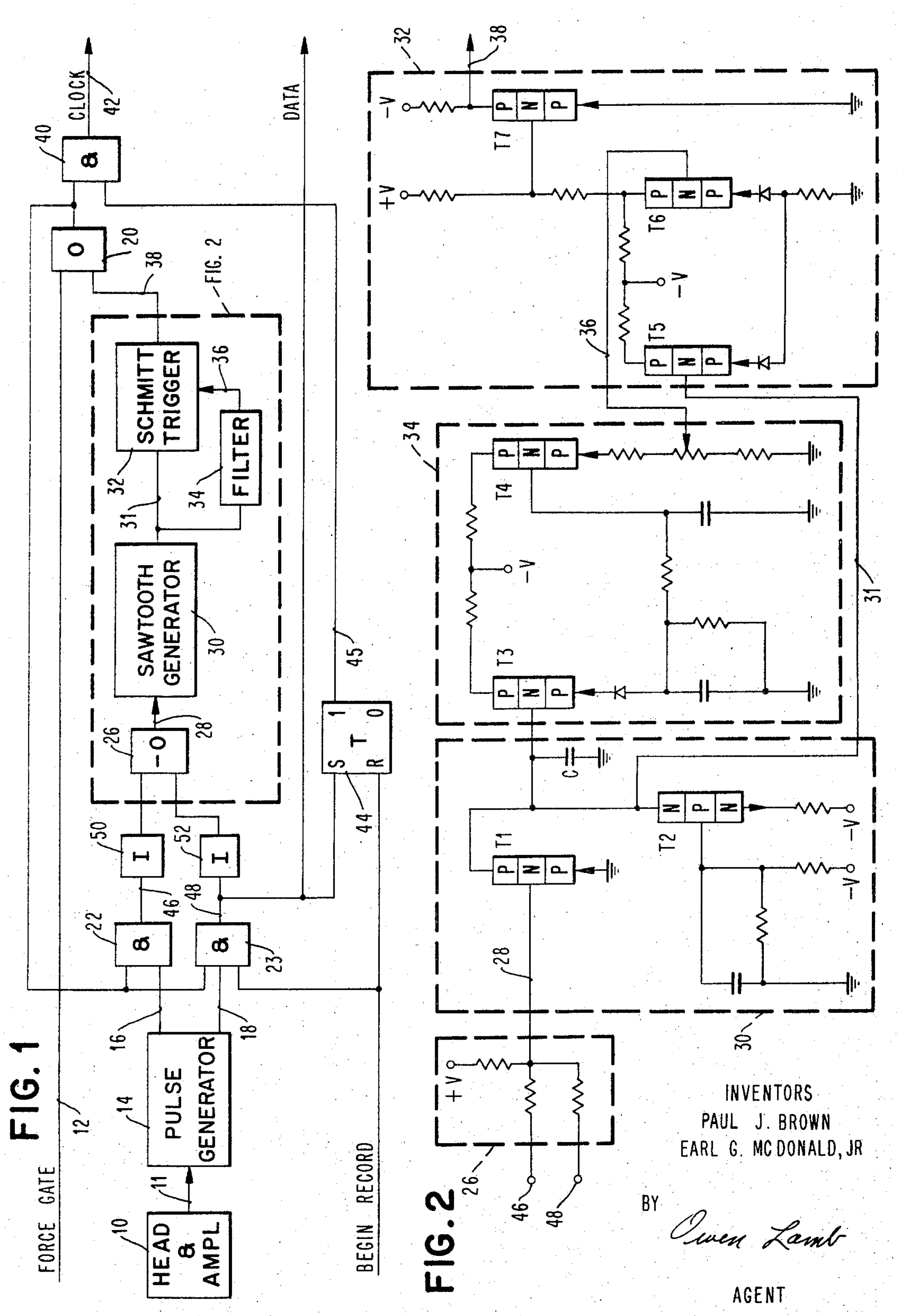
FIG. 1 is a block diagram of a phase modulated binary data detection system in which the invention is embodied.
FIG. 2 is a schematic diagram representing in more detail the logic shown within the broken lines in FIG. 1.
Figure 3:
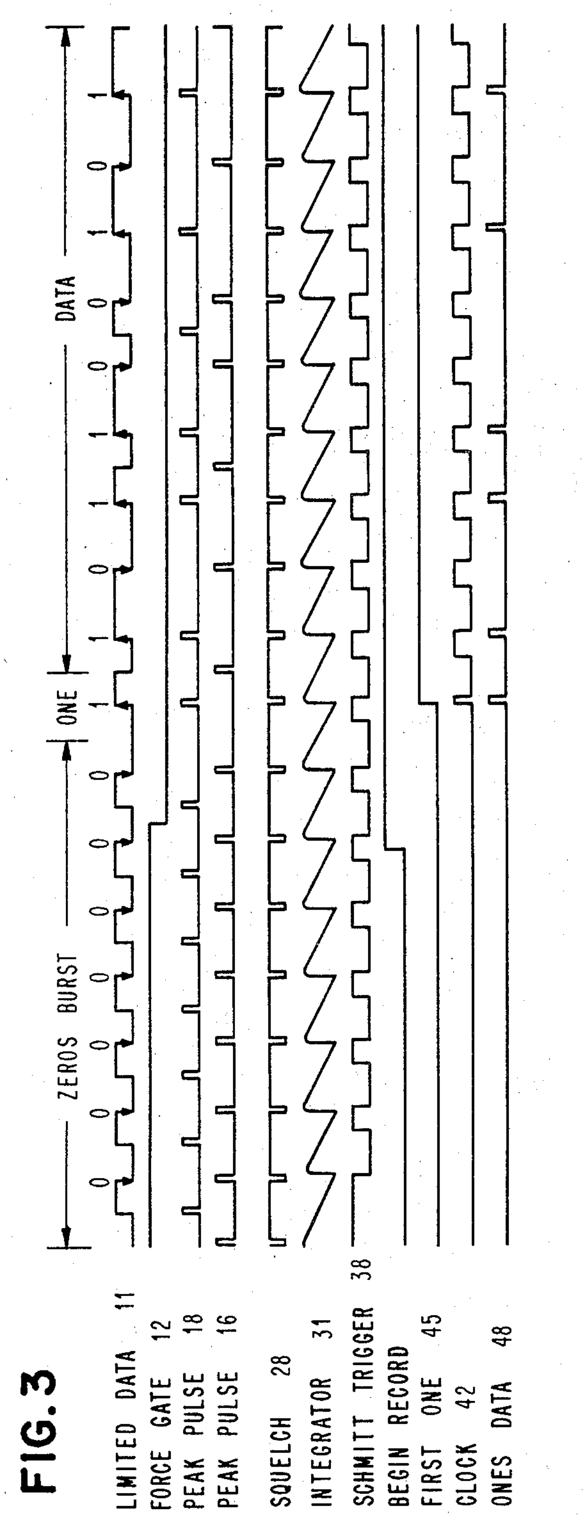
FIG. 3 is a timing chart illustrating voltage waveforms at indicated points in the circuit of FIG. 1.

The circuit operation is first described with reference to FIG. 1 and FIG. 3. A head and amplifier 10 produces data (FIG. 3) which is phase modulated. The data is shown limited for clarity. As indicated by the arrows, a zero is represented by a positive to negative shift, and a one is represented by a negative to positive shift, occurring at data time in a bit period. A force gate 12 is positive at the beginning of a cycle to provide for synchronizing the detection circuitry. A pulse generator 14 produces a peak pulse 16 occurring at negative data transitions and a peak pulse 18 occurring at positive data transitions of the limited data 11. The force gate 12 energizes OR circuit 20, the output of which maintains one leg of AND circuit 22 positive to allow the peak pulses 16 to pass therethrough. Peak pulses pass through AND 22 and through OR 26 to produce an output 28 which will be referred to as squelch output. The squelch output 28 drives an integrator 30 which causes a sawtooth voltage to be generated between squelch pulses. The sawtooth is automatically reset at each successive squelch pulse. The sawtooth drives the turn-on side of a Schmitt trigger 32 which is set to fire at approximately three-fourths of a data period. The filter 34 produces a reference level 36 which controls the point at which the Schmitt trigger fires. The output 38 of the Schmitt trigger is fed to OR circuit 20. AND circuit 40 provides a clock output 42.

During the zeros burst (FIG. 3) of the data record the force gate line 12 allows pulses resulting from negative transitions to pass through the logic and generate squelch pulses. This will insure proper phasing and allow generation of the necessary information from the integrator 30 and filter 24 to control the firing point of the Schmitt trigger. When sufficient time for this operation is passed, the force gate line is dropped, and the begin record line is brought up. At the end of the zeros burst is a single one bit. This bit is used to indicate the end of zeros burst and the beginning of data information. This first one turns on the first-one trigger 44 which provides an output to gate the clock pulses. Following the one bit is data information composed of ones and zeros.

The peak pulse line 18 results from positive transitions of the limited data and the peak pulse line 16 results from negative transitions of limited data. The gating before the squelch line 28 insures that only those pulses which occur at data time are used to generate the squelch line. The sawtooth 31 is generated by the integrator 30 which feeds the Schmitt trigger. Sawtooth 31 drives the Schmitt trigger from one state to the other state and the firing point is controlled by the filter output 36.

For a nominal bit repetition rate the firing level is set so that the sawtooth fires the Schmitt trigger after three-fourths of the bit period time has elapsed. If the frequency of the data changes such that the distance between data times increases, more negative charging of the sawtooth occurs. This causes the firing level to change accordingly. The Schmitt trigger therefore fires later in the data cycle. The opposite occurs if the time between data periods decreases.

The circuitry within the broken lines will now be described in more detail with respect to FIG. 2 and the timing diagram of FIG. 4. The inputs 46 and 48 feed an OR circuit which responds to either negative going pulses obtained from the outputs of the inverters 50, 52 shown in FIG. 1. The output 28 of OR circuit 26 is the squelch line shown in the timing diagram, FIG. 4. Transistor T2 and capacitor C comprise a constant current source integrator which generates a linear sawtooth in response to pulses derived from transistor T1. Transistors T3 and T4 form a filter, the output of which drives transistor T6. Transistors T5 and T6 comprise a Schmitt trigger which is driven on one side (T5) by the output of the integrator and on the other side (T6) by the output of the filter. The filter output controls the firing level of the Schmitt trigger. A potentiometer in the emitter circuit of transistor T4 allows an adjustment to the firing level of the Schmitt trigger. Transistor T7 amplifies the output of the Schmitt trigger to provide a positive gate to OR circuit 20 shown in FIG. 1.

Figure 4:
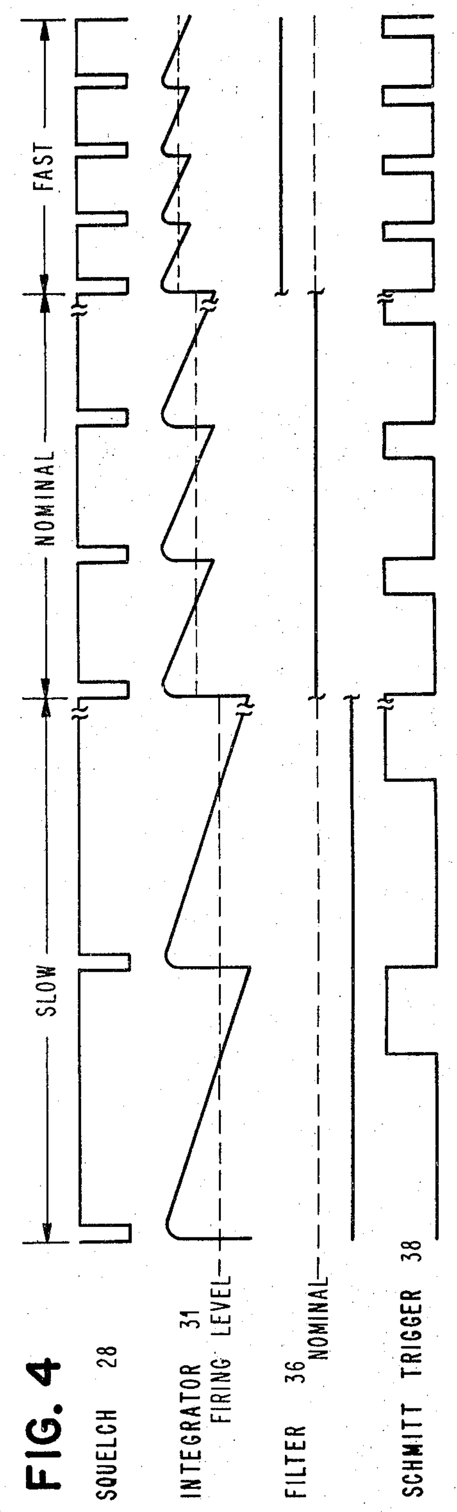
FIG. 4 is a timing diagram of embodiment shown in FIG. 2.

In FIG. 4 the squelch line is shown for slow, nominal and fast data. If the data source is running slow, the space between the pulses is larger than the nominal spacing and if the data source is running fast, the spacing is closer together than nominal. When the squelch pulses are farther apart than nominal, the sawtooth generator integrates down farther which results in the filter 36 generating a more negative reference level to the Schmitt trigger. When the pulses are closer together, the sawtooth generator does not integrate as far and the reference level rises proportionately. This means that the period of the gate output will be more or less depending upon the firing level of the Schmitt trigger but the ratio between the down time and the up time will be the same as in the nominal case. The filter insures that velocity variations will be followed very closely but the response time is chosen such that phase shifted data will not appreciably affect the generation of the gate.

The invention has been described with reference to phase encoded data. It is obvious that the invention may be utilized with respect to any recording or transmitting system in which regularly occurring clock pulses are involved. This includes double frequency recording in which data is represented by the presence or absence of data pulses inserted between regularly occurring clock pulses. In this type of system the circuit shown may be easily modified to cause the integrator-Schmitt trigger combination to synchronize on the clock pulses, after the pulses have been segregated from the data pulses.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A binary signal detection system for detecting binary signals which include regularly occurring data transitions, comprising:

means for generating a ramp voltage, the amplitude of which varies with the frequency of the recorded data;

a time gate;

means responsive to the ramp voltage when the ramp voltage reaches a predetermined firing level for turning on said time gate;

means for changing said firing level in accordance with variations in the frequency of the recorded data; and means responsive to the occurrence of a regularly occurring signal transition for turning off said time gate.

2. The invention according to claim 1 wherein said binary signals are of the phase encoded type and the polarity of said regularly occurring transitions indicates whether a data bit is a binary 1 or a binary 0 including:

means for deriving pulses corresponding to transitions of at least one polarity; and means for gating said pulses to a utilization device by said time gate.

3. The invention according to claim 1 wherein said binary signals are of the double frequency encoded type having regularly occurring clock pulses, and the presence or absence of pulses occurring at data times other than at said clock pulse times indicates whether a data bit is a binary one or a binary zero, including:

means responsive to said time gate for gating pulses occurring at data times to a utilization device.

4. A binary signal detector for detecting a binary signal of the type which includes regularly occurring clocking transitions comprising:

a voltage responsive device adapted to generate a first output voltage level when the amplitude of an input voltage is greater than a predetermined firing level and which generates a second output voltage level when the amplitude of the input voltage is less than said firing level, said voltage responsive device including firing level control means;

means responsive to said regularly occurring clocking transitions for deriving a firing voltage which varies substantially linearly from a first level toward a second level but returns to said first level upon the occurrence of a clocking transition, whereby the voltage level reached varies in magnitude depending upon the times of arrival of said clocking transitions;

means for applying said derived voltage to the input of said voltage responsive device;

means for deriving a control voltage whose amplitude varies in proportion to variances in the repetition rate of said regularly occurring clocking transitions; and means for applying said control voltage to said firing level control means to thereby cause said voltage responsive device to fire earlier or later depending upon the repetition rate of said clock pulses.

5. The invention as defined in claim 4 wherein said means for deriving a firing voltage includes an integrator which generates a ramp voltage and said means for deriving a control voltage includes a filter responsive to said integrator for generating an output voltage which varies with the magnitude of the ramp signal voltage.

6. A binary signal detector for detecting a binary signal which varies from one level to another level and wherein a transition from the first level to the second level at data time indicates a binary digit of one value and a transition from the second level to the first level at data time represents a binary digit of the opposite value comprising:

a pulse generator for generating first pulses corresponding to the first mentioned transitions and for generating second pulses corresponding to the opposite transition;

a voltage comparator for generating output pulses which occur at data times in a bit period at which time a signal transition is certain to occur;

an integrator;

means responsive to said voltage comparator output pulses for gating the first and second detector pulses to said integrator circuit which generates a sawtooth voltage in response thereto, the amplitude of which varies with the difference between said detector pulses;

a filter responsive to said sawtooth signal for generating a control voltage whose amplitude varies in accordance with the peak voltage of said sawtooth;

means for applying the output of said integrator to the input of said voltage comparator; and means for applying the output of said filter to said voltage comparator to control the firing level thereof;

whereby the voltage comparator output pulse widths vary in direct proportion to variations in the repetition rate of the signal transitions.

7. The invention as defined in claim 6 including means for forcing an output from said voltage comparator to thereby gate said first and second detector pulses to said integrator so that the binary detector can synchronize initially, and means for removing said forcing means after synchronization is attained.

8. A detector for detecting a binary signal which varies from one level to another level and wherein a transition from the first level to the second level at data time indicates a binary digit of one value and a transition from the second level to the first level at data time represents a binary digit of the opposite value comprising:

a threshold device for generating a gate output when an input thereto reaches a predetermined threshold and for turning off the gate when the input falls below the threshold, said device including means for controlling the threshold level;

means for producing pulses on each signal transition;

squelch means responsive to said gate output for gating only pulses occurring at each data time;

means responsive to said squelch means for generating a ramp voltage at the beginning of each squelch pulse which ramp is ended on the occurrence of the next squelch pulse;

means for applying said ramp to said threshold device to fire said device when said ramp reaches the threshold level thereof; and means for controlling the threshold firing level in response to the amplitude of said ramp voltage to thereby increase the threshold firing point for larger ramp voltages and to decrease said threshold firing point for smaller ramp voltages.

References Cited

UNITED STATES PATENTS

| | | | |
|---|---|---|---|
| 3,064,208 | 11/1962 | Bullock et al. ---- | 329—107 X |
| 3,339,088 | 8/1967 | Dillard ----------- | 328—35 X |

ALFRED L. BRODY, *Primary Examiner.*